US012578451B2

(12) United States Patent　　　　　　(10) Patent No.:　US 12,578,451 B2

Molchanov　　　　　　　　　　　　　(45) Date of Patent:　Mar. 17, 2026

(54) PASSIVE RADAR SYSTEM FOR DETECTION OF LOW-PROFILE LOW ALTITUDE TARGETS

(71) Applicant: Pavlo Anatoliyovich Molchanov, Las Cruces, NM (US)

(72) Inventor: Pavlo Anatoliyovich Molchanov, Las Cruces, NM (US)

( * ) Notice: Subject to any disclaimer, the term of this patent is extended or adjusted under 35 U.S.C. 154(b) by 604 days.

(21) Appl. No.: 17/971,582

(22) Filed: Oct. 22, 2022

(65) Prior Publication Data

US 2024/0134027 A1　　Apr. 25, 2024
　US 2024/0230874 A9　　Jul. 11, 2024

(51) Int. Cl.
　*G01S 13/44*　　　(2006.01)
　*G01S 13/00*　　　(2006.01)

(52) U.S. Cl.
　CPC ........ *G01S 13/4472* (2013.01); *G01S 13/003* (2013.01); *G01S 13/4463* (2013.01)

(58) Field of Classification Search
　CPC .... G01S 13/003; G01S 13/42; G01S 13/4463; G01S 13/4472
　See application file for complete search history.

(56) References Cited

U.S. PATENT DOCUMENTS 7,619,554 B2 * 11/2009 Shklarsky ............. G01S 13/003
　　　　　　　　　　　　　　　　　342/191
　2022/0268908 A1 * 8/2022 Daniels ................... G01S 13/06

* cited by examiner

*Primary Examiner* — Timothy X Pham

(57) ABSTRACT

A passive radar system and method of detection of low-profile low altitude targets based on the application of Low Earth Orbit (LEO) and Very Low Earth Orbit (VLEO) satellite signals. The staring array of directional antennas covers the entire sky and provides continuous illumination (receiving reflected satellite signals) from multiple targets for fast detection, recognition, and target tracking and increasing detection range. The coupling of each directional antenna with a separate receiver channel allows the fast continuous process of information from all targets simultaneously. Monopulse processing of signals from reference sub-set of antennas with overlap antenna patterns provides the highest directing accuracy and better clutter/noise and media influence suppression. A directional antenna array does not need a beam-forming module. The system has a small weight, and size may be portable or mounted on a light vehicle or small drone because small size and weight.

8 Claims, 12 Drawing Sheets

FIG.4

Satellite
301

Satellite signal
302

Target
303

Beam scanning to
cover space sector

Short Pulse, reflected from target.
Pulse duration proportional to
target illuminating (receiving
reflected signal) time.
304

Covered space sector
120 degrees max.
306

Synthesized phase array
beam
307

Phase Array
305

(a)

Array of Directional Antennas (b)

1

PASSIVE RADAR SYSTEM FOR DETECTION OF LOW-PROFILE LOW ALTITUDE TARGETS

ASSIGNEE

Appl. No.:

| Int. Cl.: | |
| --- | --- |
| G01S 13/03 | (2006 January) |
| G01S 13/02 | (2006 January) |
| G01S 13/72 | (2006 January) |
| G0IS 7/03 | (2006 January) |
| G0IS 7/40 | (2006 January) |

CPC: G01S 13/00 (2006.01); G01S 13/02 (2006.01); G01S 13/03 (2006.01); G01S 13/72 (2006.01).
Field of Classification Search: G01S 7/02 (2006.01); G01S 7/023 (2006.01); G01S 7/03 (2006.01); G01S 7/354 (2006.01); G01S 7/040 (2006.01); G01S 7/4865 (2006.01); G01S 7/493 (2006.01); G01S 7/536 (2006.01); G01S 13/00 (2006.01); G01S 13/02 (2006.01); G01S 13/03 (2006.01); G01S 13/08 (2006.01); G01S 13/325 (2006.01); G01S 13/931 (2006.01); G01S 15/08 (2006.01); G01S 17/08 (2006.01); G01S 17/32 (2006.01).

CROSS REFERENCE

US Patent Documents

| | | | |
| --- | --- | --- | --- |
| U.S. Pat. No. 7,619,554 B2 | November 2009 | Dan Abraham Shklarsky | |
| US 2022/0268908 A1 | August 2022 | Robert Clark Daniels et al. | |
| WO 2011/033320 A2 | March 2011 | Oswald Gordon | |
| U.S. Pat. No. 0,035,783 A1 | February 2014 | Pavlo A. Molchanov | 342/357.59 |
| 3,906,505 | September 1975 | Stephen E. Lipsky | 343/119 |

OTHER PUBLICATIONS

1. Alp Sayin, Mikhail Cherniakov, Michail Antoniou "Passive radar using Starlink transmissions: A theoretical study" Department of Electronic, Electrical and Systems Engineering, University of Birmingham, UK, Apr. 14, 2019.
2. S. Harman "A comparison of staring radars with scanning radars for UAV detection: introduction of the Alarm™ staring radar", 2015, European Radar Conference (EURAD), EUMA, September 2015, 185-188, XP032824534.
3. S. E. Lipsky, "Microwave Passive Direction Finder", SciTech Publishing Inc. Raleigh, NC 27613, 2004.
4. P. Molchanov, A. Gorwara, "Fly Eye Radar Concept". IRS2017. International Radar Symposium, Prague, July 2017.

PRIOR ART

Passive radars are based on the reception of a group of signals transmitted by outside non-cooperative sources. These signals may be of different kinds, e.g., frequency-modulated (FM) radio, Digital Video Broadcasting (DVB-T), Global System for Mobile Communications (GSM), Global Navigation Satellite System (GNSS). The passive radar system receives these signals in two ways: first is the signal directly from a transmitter (direct or reference signal), second is the signal reflected from an object of interest (reflected or scattered from target signal) (FIG. 4). Target is detecting by the comparison and analysis of direct and reflected signals. In passive radar, a signal reflected or scattered from an object is correlated with the signal originating at the transmitter as a direct or reference signal. Object's presence, distance, and velocity can be detected as a result. The main part of this receiver is an antenna array, signal conditioning circuit and processor. This kind of system does not transmit a signal to illuminate a target. It relies exclusively on the signals transmitted from the outside transmitters (transmitters of opportunity). Such a system is completely undetectable due to lack of any Electro-Magnetic (EM) transmission. As result passive radar cannot be attacked by an anti-radar missile. It is inexpensive, easy to deploy, and undetectable for other sensors. The advanced methods of signal processing developed nowadays allow to perform a higher-order analysis, e.g., target tracking or imaging with such a system.

Passive radar utilizing space-born digital electromagnetic illuminators described in U.S. Pat. No. 7,619,554 B2 patent, Dan Abraham Shklarsky, November 2009, (FIG. 1). In this passive radar system, a space-borne transmitter broadcasts wide-band digitally modulated signals over a region and illuminates the region. A receiver antenna is oriented to receive radiation from at least one portion of the region. The portion is an area viewed by the receiver antenna. A reference antenna is oriented toward the transmitter, the reference antenna receives a portion of the wide-band digitally modulated signal. A coherent processing time duration is selected based on a radar cross-section of a target within the viewed area, the bandwidth of the wide-band digitally modulated signal, and the viewing angle of the receiver antenna. The received signal from the receiver antenna is coherently processed with a reference signal from the reference antenna, over a time interval greater than the coherent processing time duration. However using a few separate antennas required lot of space and pointing accuracy, which is sometimes not possible.

A method of determining the location of a physical object using a passive radar receiver described in US 2022/0268908 A1 patent, Robert Clark Daniels, Aug. 2022 presented in FIG. 2. A method of determining the location of a physical object using a passive radar receiver includes determining if a transmitter beam sweeping period (TBSP) is known and executing a TBSP-based receiver beam sweeping if the TBSP is known. If the TBSP is not known, determining if the TBSP can be measured, and executing the TBSP-based beam sweeping if the TBSP can be measured. The method includes executing a random receiver beam sweeping if the TBSP is not known and cannot be measured. The method includes determining relative time of arrival of radio signals between the line of sight (LoS) path and the target path and determining the propagation times on the LoS path and on the target path. The method includes determining the location of the physical object using the propagation times.

In the paper of Alp Sayin, Mikhail Cherniakov, Michail Antoniou "Passive radar using Starlink [1] the LEO satellites signals for radar passive detection are examined. A study on passive radar detection capabilities using SpaceX broadband internet satellite constellation has been done. The passive radar system was found to be feasible when compared to an already proven system, GNSS, with a similar structure. For returns from a single satellite cell with over a 250 MHz bandwidth and the size of both the reference antenna (for direct signal reception) and the radar antenna (for echo reception) assumed to be 1 m2, at X-band, the beamwidth of such an antenna would be about 1.3 degrees. This antenna may be a phased array, or a multi-beam staring array for a chosen target area.

S. Harman in his paper "A comparison of staring radars with scanning radars for UAV detection" [2]. Staring radars have multiple static receiver beams that do not scan and are constantly sensing. The fundamental difference between staring and scanning radars is that for a staring radar the transmit beam is stationary and fully filled with potentially multiple static receiver beams. The number of receiver beams within the transmit floodlight determines the gain on receive and the ability to localize in angle. The key opportunity that staring radars offer is the ability to give exceptional information and utility e.g., optimal detection, tracking, and target ID capability in an optimal time (FIG. 3). This is due to the ability to set the processing dwell time for a given task or alternatively work using multiple parallel processes each having different processing dwell times. Clearly this technique is unachievable in mechanically scanned surveillance radars or conventional phased array radars that can only afford to schedule short periods of time to a given sector in order to maintain complete coverage with acceptable latency.

To reach maximal accuracy of direction finding Lipsky S. E. [3] proposed an antenna array of a plurality of fixed, narrow beamwidth antennas, geographically oriented to provide omnidirectional coverage, a set of antennas is selected. It presents an explanation of the monopulse method for microwave direction finding with two pairs of directional antennas, positioned by Azimuth and Elevation boresight named monopulse subarray. The general theory of the monopulse method considers that the angle sensing function falls into one of three categories: amplitude, phase, or a combination developed by combining their sum and difference ($\Sigma$–$\Delta$).

The phase angle difference, as measured in each antenna, compared against the arriving signal phase front, is denoted as $\psi$. The difference in signal path length is defined by the equation, $S = D \sin \varphi$, which depends on the antenna aperture displacement (spatial angular shift) $D$. Letting $\varphi$ be the phase lag caused by the difference in the time of arrival between two signals gives:

$$\psi = -2\pi \frac{S}{\lambda} = -2\pi \frac{D\sin\varphi}{\lambda}, \tag{1}$$

where:
$\varphi$—the angle of arrival measured from bore sight; $\lambda$—the wavelength.

If A and B are RF voltages measured at the reference boresight and incident antennas, respectively, then $$A = M\sin(\omega t) \tag{2}$$

-continued and $$B = M\sin(\omega t + \psi) = M\sin\left(\omega t - \frac{2\pi D}{\lambda}\sin\varphi\right), \tag{3}$$

where M is a common constant defined by signal power. This shows that the angle of arrival $\varphi$ is contained in the RF argument or phase difference of the two beams for all signals off the boresight axis. Direction finding by way of amplitude comparison methods can provide a root mean square (RMS) accuracy smaller than 2° in 100 ns after a direct wave arrives. High accuracy phase measurements provide high accuracy and fast direction finding (FIG. 4). But most important, that monopulse method does not required a long time, from millisecond for small amount operations to tens of seconds for FFT (Fast Fourier Transform), computer calculations and can provide critical information about targets position, speed and identity. Combination of staring antenna array with high directional accuracy monopulse method proposed in paper P. Molchanov, A. Gorwara, "Fly Eye Radar Concept" [4].

BACKGROUND OF THE INVENTION

Present invention related to systems using the reflection or reradiation of radio waves, e.g., radar systems, which including analogous systems using reflection. More particular to bistatic or multi-static radar systems with non-cooperative transmitting source. As transmitting source proposed application of LEO and VLEO satellite signals, which can provide more power than GNSS constellations and available at some remote areas.

DESCRIPTION OF RELATED ART

In the patent "Passive coherent location system and method", U.S. Pat. No. 6,522,295 B2 Baugh et al., Feb. 18, 2003, proposed passive radar system for enhancing object State awareness. The system includes a receiver subsystem that receives reference signals from an uncontrolled transmitter and scattered transmissions originating from the uncontrolled transmitter and scattered by an object. The system also includes a front-end processing subsystem that determines a radial velocity of the object based on the received transmissions. The system also includes a back-end processing subsystem that determines object state estimates based on the determined radial velocity.

System needs to use selected a subset of uncontrolled transmitters. The step may comprise Selecting a Subset of uncontrolled transmitters from a plurality of uncontrolled transmitters based on a Set of predetermined criteria. Subset of uncontrollable transmitters not always possible at some area of radar application.

Stephen Anthony Harman in his patent from Jul. 13, 2021, U.S. Pat. No. 11,061,114 B2 "Radar system for the detection of drones" and patent U.S. Pat. No. 9,097,793 B2 "System for the detection of incoming munitions" proposed a radar system for the detection of drones, including a transmitter, a receiver and a processor, wherein the processor is arranged to process demodulated return signals in a first process using a Doppler frequency filter, and to store locations of any detections therefrom, and to process the demodulated signals in a second process to look for signal returns indicative of a preliminary target having a rotational element at a location, and should a detection be found in the second process, to then attempt to match a location of the preliminary target with returns from the first process, and to provide a confirmed detection if a location of a detection from the first process matches with the location of a detection from the second process.

System provides good accuracy of multiple targets detection with non-scanning antenna beam that illuminates the entire search space, but it is not passive and transmitting signals can be detected. Computing of received signals take some time exceeded time for hypersonic missile hit on tactical distance.

In patent WO 2011/033320 A2, March 2011, by Oswald Gordon, which presented in FIG. 3. Accordingly, the present invention provides an improved radar receiver, and improved methods for operating, calibrating, and fabricating a radar receiver. The receiver comprising: at least one antenna comprising an array of antenna elements; a first processing stage adapted to process radar signals received via each antenna element of said array; and a second processing stage adapted to serve the first processing stage; wherein said first and second processing stages are each arranged substantially parallel to one another, and to said antenna substrate.

Every antenna element in phase array needs to be omni-directional as minimum in area of beam control. It means, all antenna elements will receive any jamming signal directed from all angles of view. Adaptive algorithm will be possible only, if jamming signal not large enough to saturate all antenna elements simultaneously.

Proposed phase controllable array of antenna elements, wherein first processing stage connected to a few antenna elements. Signals not digitizing on each antenna and not processing from each antenna. Simultaneous digitizing and processing of signals from each antenna element will provide faster processing time for radar.

Application of antennas with overlap antenna patterns will allow better direction finding accuracy by application monopulse method of signals processing and signals from reference antennas.

SUMMARY OF THE INVENTION

An objective of the present invention is development of passive radar system and method of detection of low-profile low altitude targets based on application of Low Earth Orbit (LEO) and Very Low Earth Orbit (VLEO) satellites signals. Staring array of directional antennas can cover entire sky and will provide continuous illumination (receiving reflected satellite signals) from multiple targets for fast detection, recognition and targets tracking and increasing detection range. Coupling of each directional antenna with separate receiver cannel will allow fast continuous process of information from all targets simultaneously. Monopulse processing of signals from reference sub-set of antennas with overlap antenna patterns can provide highest directing accuracy and better clutter/noise and media influence suppression. Directional antenna array does not need beam forming module. System will have small weight, size, may be portable or mounted on light vehicle or small drone because small size and weight.

Proposed passive radar system based on application of LEO and VLEO satellites signals for detection of low-profile low altitude targets. In first embodiment radar receiver comprising at least one array of antenna elements and at least one processing stage adapted to process signals received via each antenna element of said array wherein for fast targets signals processing said array of antenna elements arranged as staring array of directional antennas covering entire sky and provide simultaneous continuous illumination (receiving reflected satellite signals) of multiple targets. Each directional antenna coupled with separate processing stage providing fast continuous parallel process of information from all targets simultaneously. Antenna patterns of said directional antennas overlap in one or more directions for creating monopulse subarrays, where signals from reference antennas providing highest directing accuracy and better clutter/noise and media influence suppression. Each said processing stage comprising receiving chain with signal conditioning circuit including voltage or current limiters, anti-aliasing circuits and connected to Field-Programmable Gate Array (FPGA) and to actuator control. Each said monopulse subarray comprising of FPGA for simultaneous one or multi-axis processing of all signals in receiving chains as ratio of amplitudes and/or phase shift of signals for direction finding and one-iteration adapting for clutter suppressing or decrease transferring media influence to receiving chain parameters by phase shift in subarray of neighboring directional antennas with overlap antenna patterns. Each said monopulse subarray connected by digital interface arranged as universal serial bus (USB) or microwave and/or fiber optic waveguides directly to actuator control for fast control of alarm, display, communication or executive means. All said processing stages comprising receiving chains, monopulse processor and signal processor connected with synchronization means.

Detection of direct satellite signals and satellite signals reflected from targets providing by continuous (not scanning) staring array of directional antennas covering entire sky or area of observation and providing simultaneous continuous illumination (receiving reflected satellite signals) of multiple targets. Simultaneous (parallel) processing of direct satellite signals and satellite signals reflected from targets from each directional antenna by separate processing stage including a reference signal for target detection, which is correlated with the reflected signal. Digitizing of direct satellite signals and satellite signals reflected from targets directly in each directional antenna by separate processing stage comprising receiving chain with signal conditioning circuit including voltage or current limiters, anti-aliasing circuits, analog-to-digital converter and connected by digital interface to signal processor and feed network. Simultaneous (monopulse) processing of direct satellite signals and satellite signals reflected from targets received by said directional antennas with overlap antenna patterns in one or more directions for creating monopulse subarrays, where signals from reference antennas providing highest directing accuracy and better clutter/noise and media influence suppression. Simultaneous (monopulse) processing of all signals in receiving chains as ratio of amplitudes and/or phase shift of signals for direction finding and one-iteration adapting for clutter suppressing or decrease transferring media influence to receiving chain parameters by phase shift in subarray of neighboring directional antennas with overlap antenna patterns. Transferring processed signals to feed network by digital interface arranged as universal serial bus (USB) or microwave and/or fiber optic waveguides connected to signal processor. Synchronization of all said processing stages comprising receiving chains, monopulse processors and signal processor connected by digital interface.

DETAILED DESCRIPTION OF THE INVENTION

Figure 1:
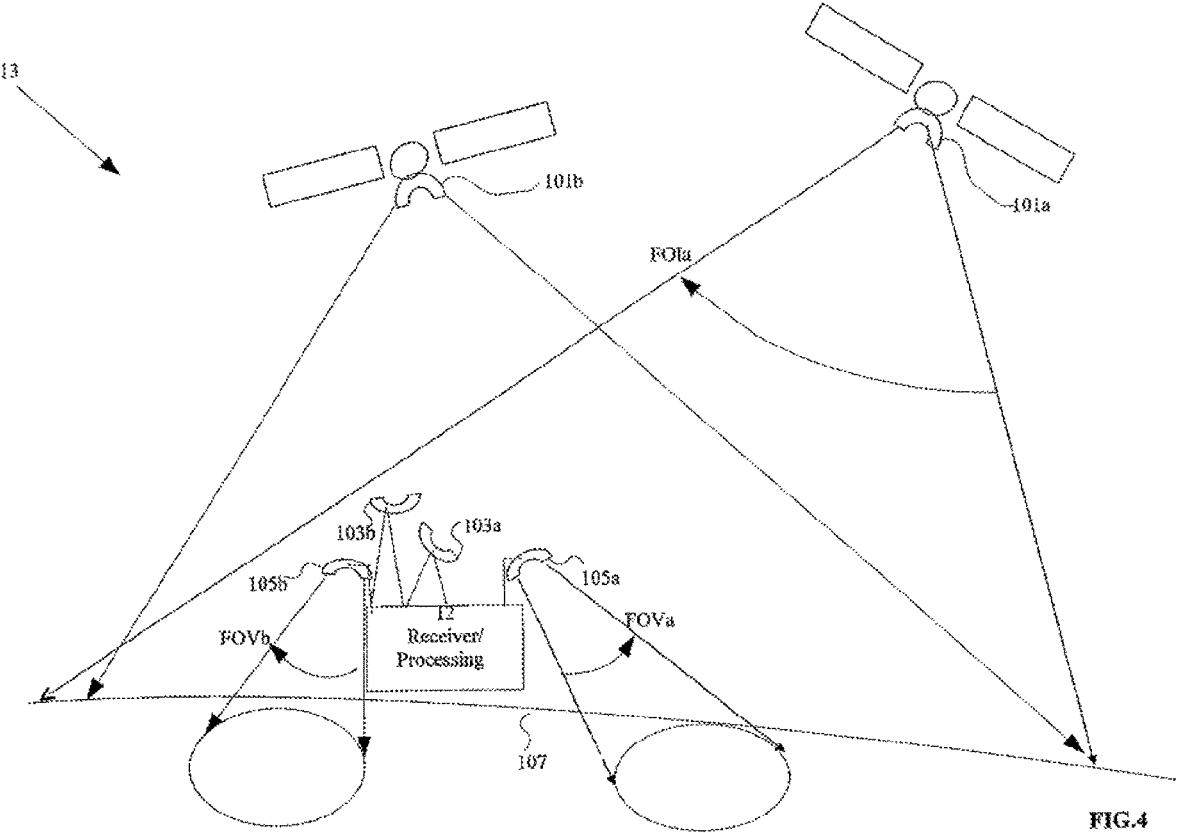
FIG. 1 shows a known embodiment of the passive radar system using satellite signals with an array of separate directional antennas.
Figure 2A:
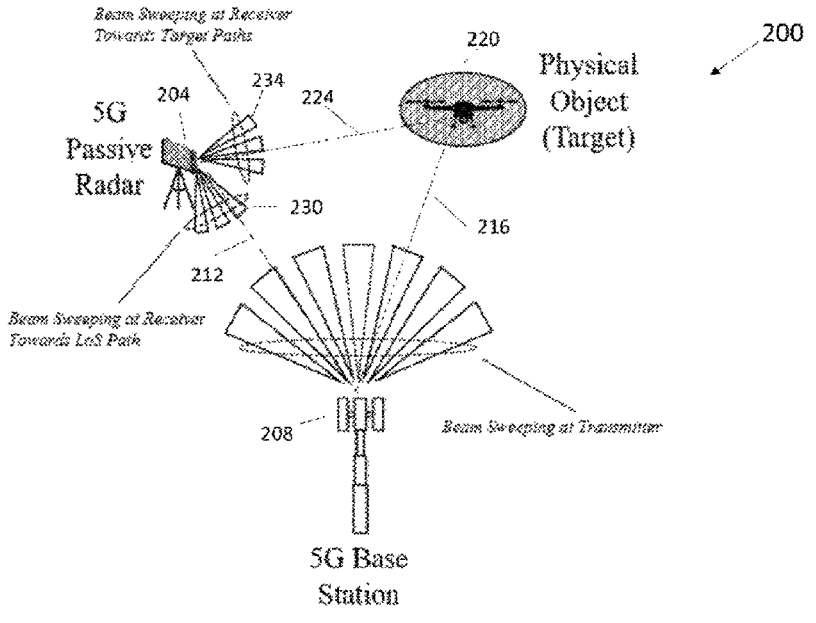
FIG. 2 shows a known passive radar system based on the application of signals of a cell phone's base station and sweeping phase array.
Figure 2B:
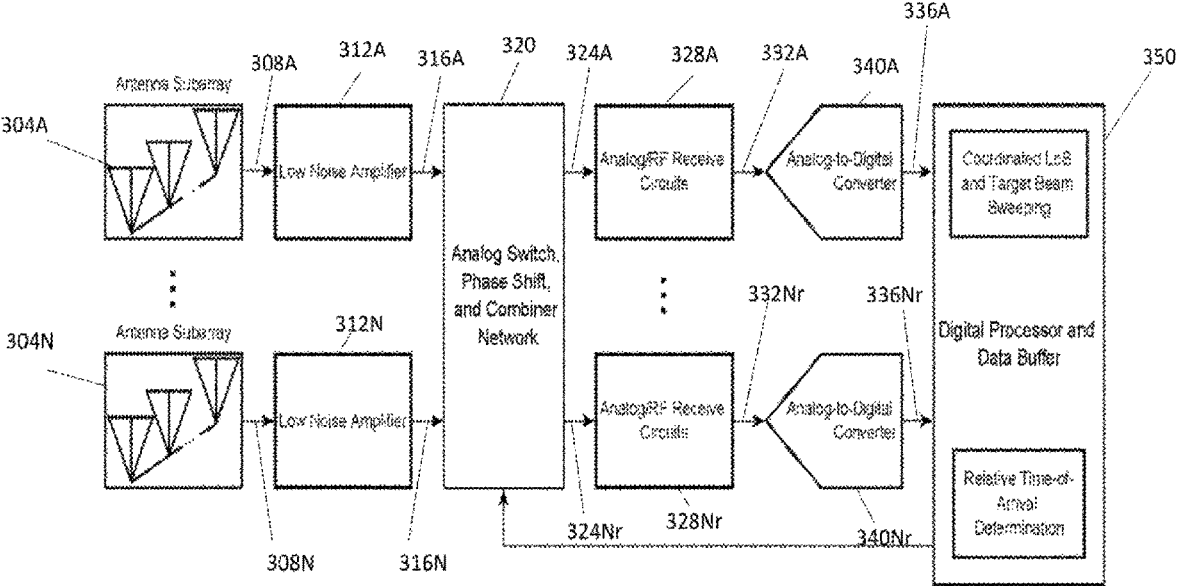
Figure 3:
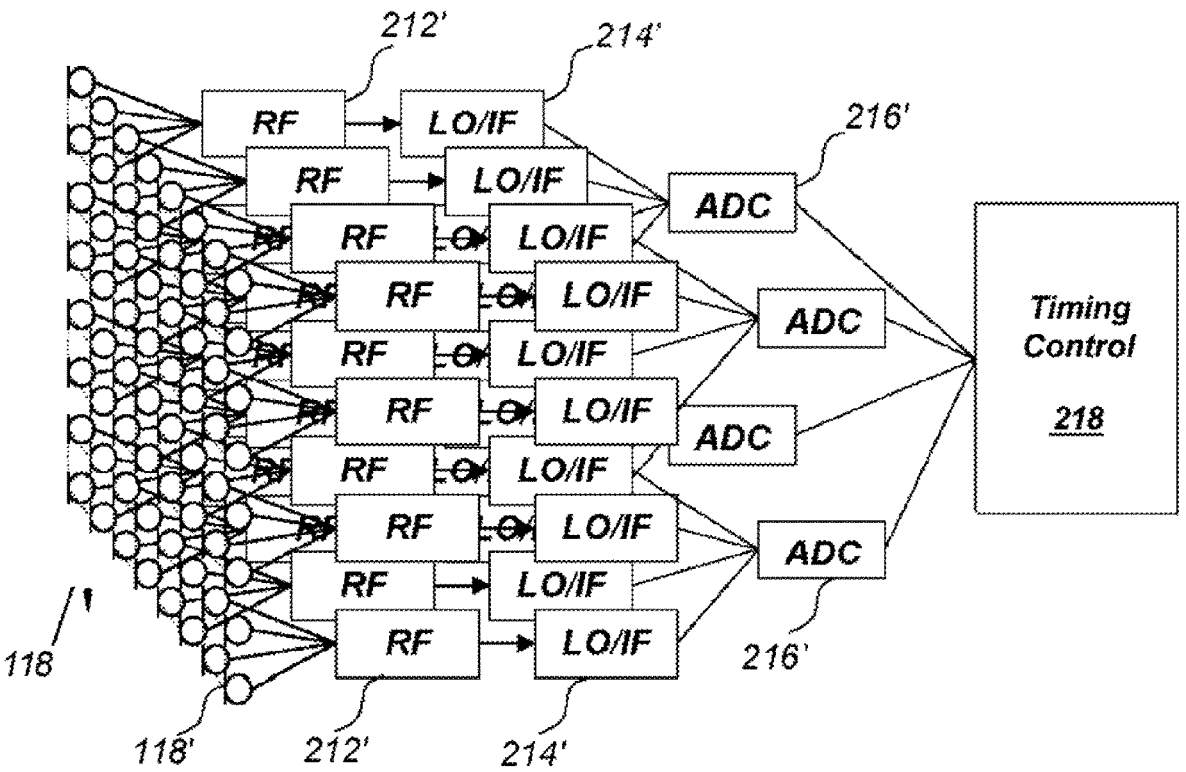
FIG. 3 shows a holographic phase array receiver structure.
Figure 4:
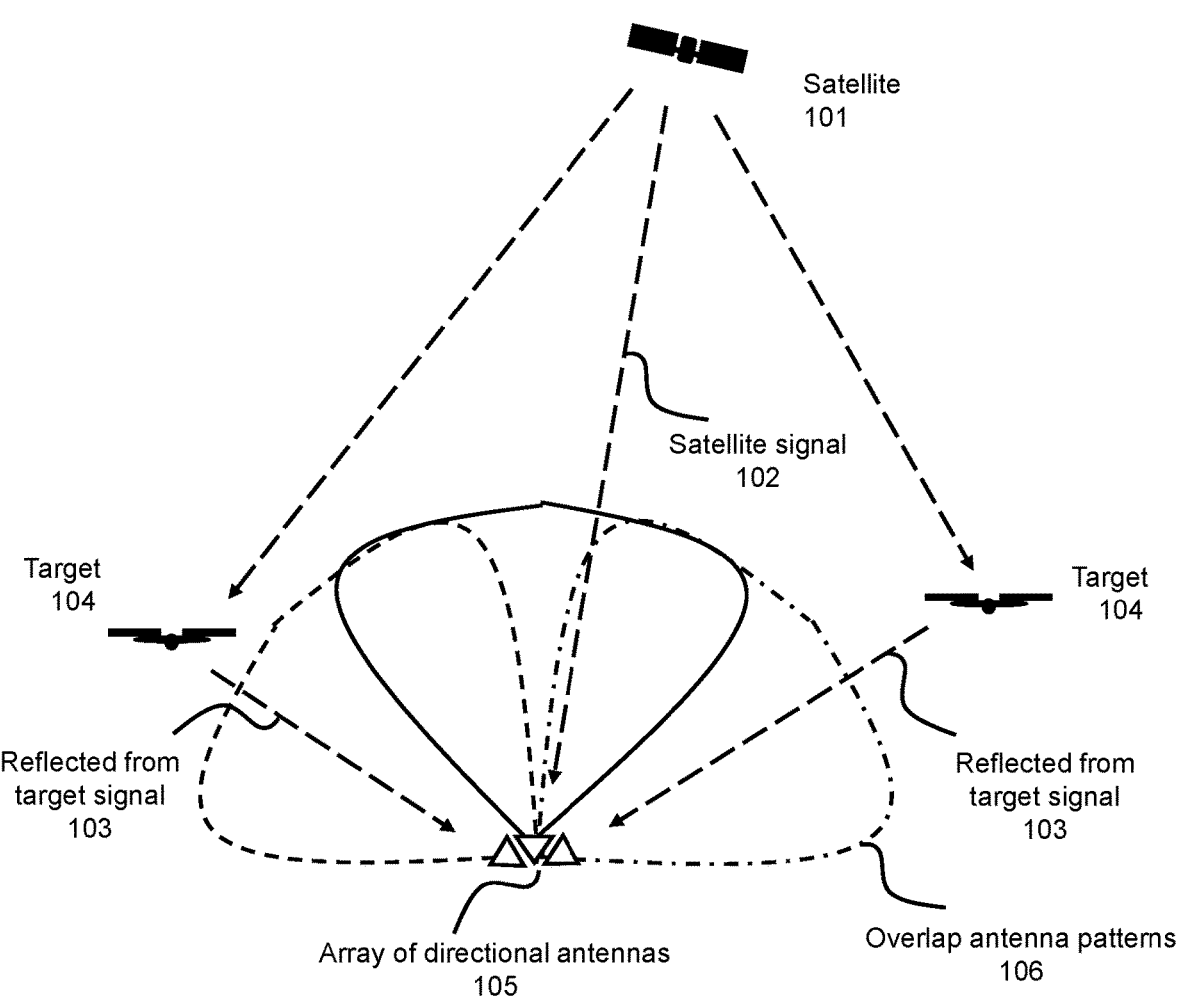
FIG. 4 shows a diagram of passive radar with an array of directional antennas based on satellite signals.

Corresponding to preliminary investigation LEO or/and VLEO satellites transmitting signals, which can be used for passive target detection [1]. Diagram of proposed passive radar system based on application of LEO and VLEO satellites signals for detection of low-profile low altitude targets presented in FIG. 4. Satellite 101 transmitting signals 102, which can be reflected or scattered 103 by a target, or multiple targets 104. The array of directional antennas 105 allows simultaneous detection and track multiple targets with high accuracy by using overlap antenna patterns 106 and the monopulse method of parallel signal processing. The array of directional antennas does not require increasing size base between antennas and same time provide better directional accuracy.

Figure 5:
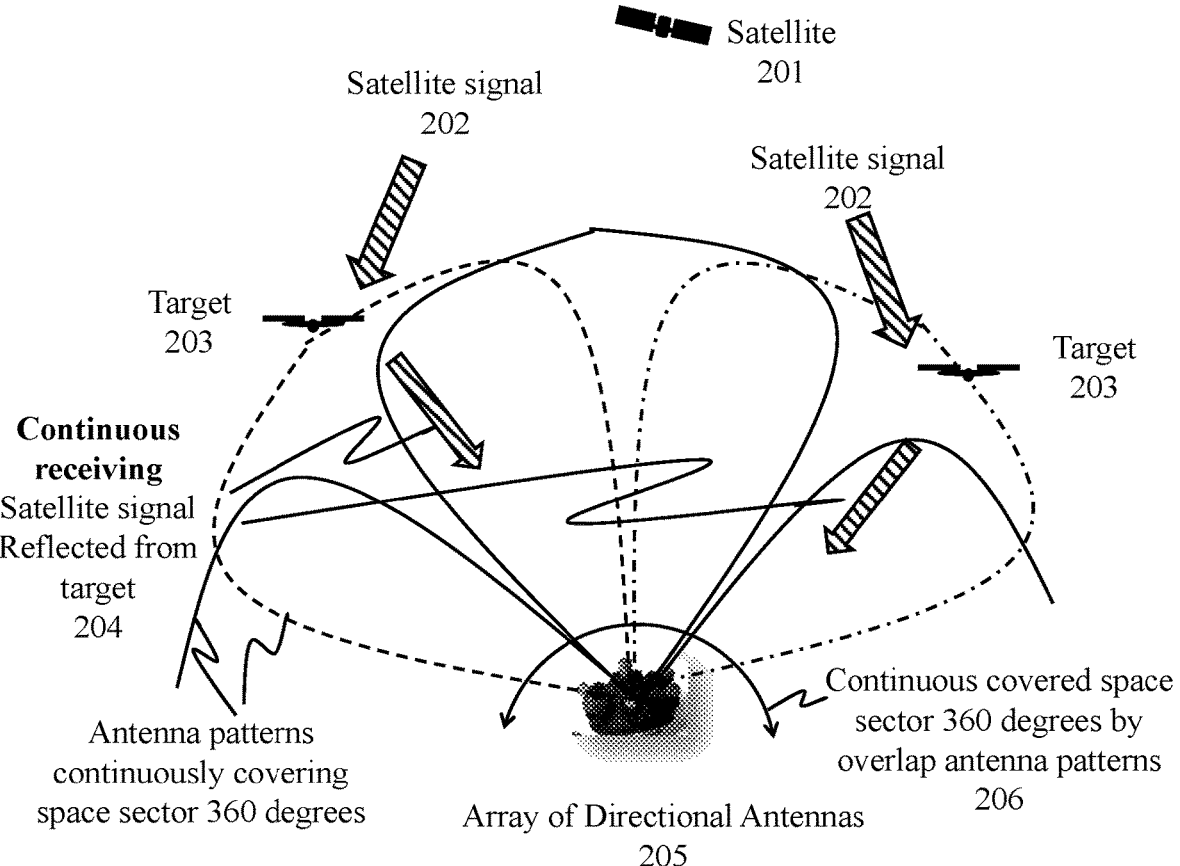
FIG. 5 shows a diagram of passive radar with an array of directional antennas based on satellite signals.
Figure 6:
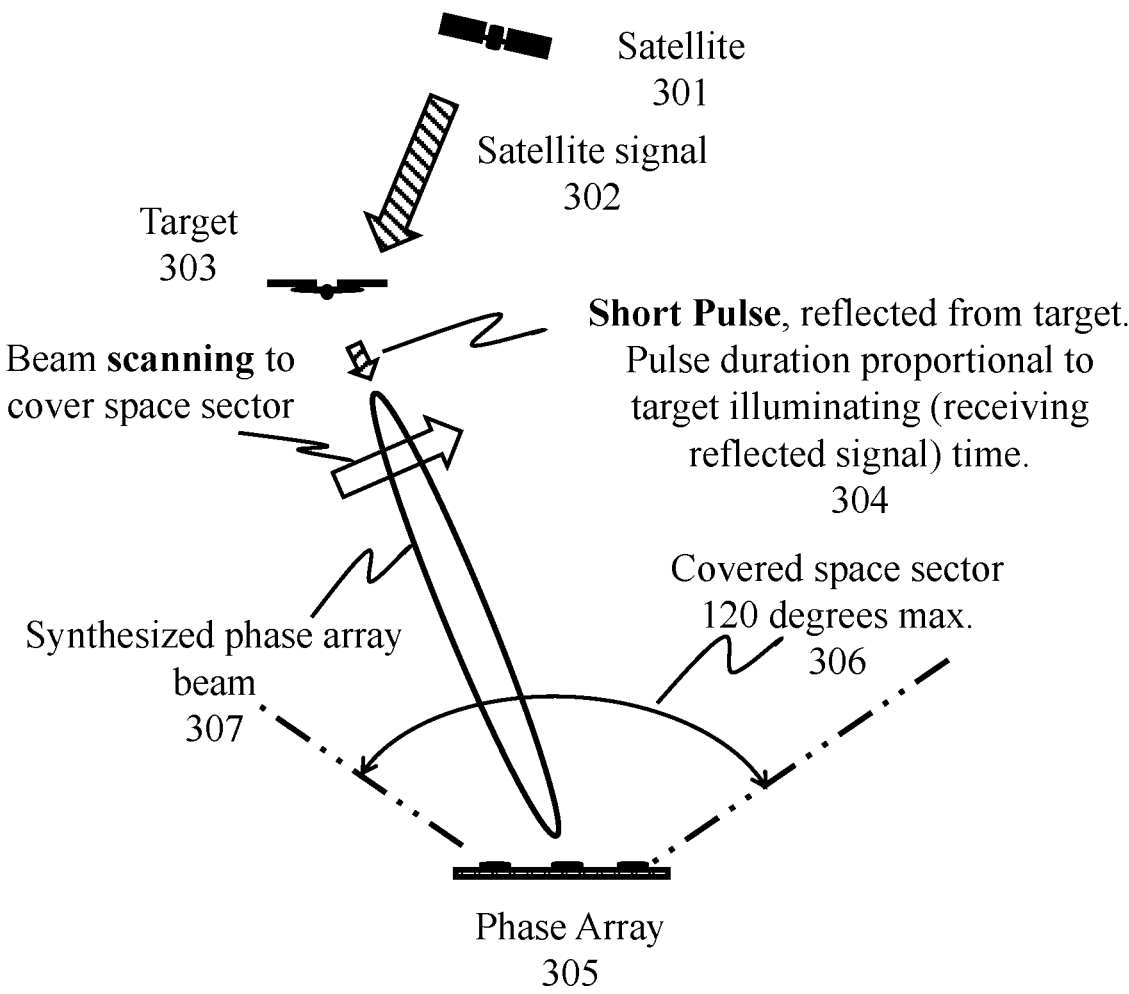
FIG. 6 shows a diagram of prior art passive radar with a scanning phase array based on satellite signals.

FIG. 5 shows a diagram of passive radar with an array of directional antennas based on satellite signals. Satellite 201 transmitting signals 202, which can be reflected or scattered 203 by a target, or multiple targets 204. The array of directional antennas 205 allows simultaneous detect and track multiple targets with high accuracy by using overlap antenna patterns 206 continuously covering sector 360 degrees and monopulse method of parallel signals processing. Continuous staring, non-scanning, multiple targets by directional antennas allow continuous receiving of satellite signals reflected or scattered from multiple targets and simultaneous processing of these signals. Time of illumination (receiving reflected from targets signals) may be increased by two-five orders compare to phase arrays with scanning beam, where narrow beam illuminating each target very short time only and reflected from targets signals very short (FIG. 6). As result staring array of directional antennas provides dramatically more information about each target and increasing the range of passive radar by increasing time of integration of reflected from target signals FIG. 6 shows a diagram of prior art passive radar with a scanning phase array based on satellite signals. Satellite 301 transmitting signals 302, which can be reflected or scattered 303 by a target, or multiple targets 304. Plane phase antenna array 305 can cover 120 degrees area maximum by synthesized phase array beam 307. The beam needs to be narrow to provide better directional accuracy, which is determined by the size of the beam spot. Beam scanning to cover space sector 308 and can illuminate (receive reflected from target signals) short time only, like a short pulse. Faster beam scanning decreasing illuminating time for targets, radar range and information about targets.

Scanning phase array allows simultaneous detection and tracking of multiple targets by switching beam, which decreasing more time of each target illumination. The array of directional antennas allows simultaneous parallel processing of signals from all antennas same time.

Increasing of number of scanning beams proportional decreasing number of beam forming antenna elements and decreasing array gain, sensitivity and radar range. Gain and radar range constant for array of directional antennas.

Figure 7:
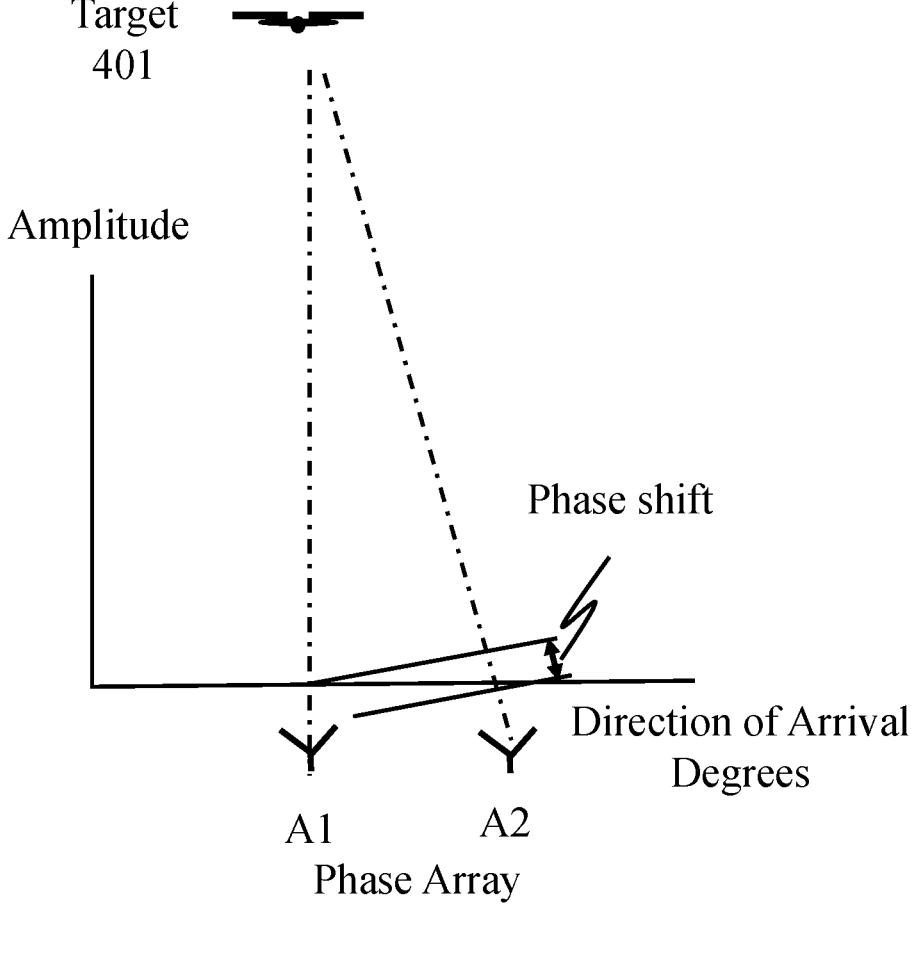
FIG. 7 shows a diagram of phase difference measurement using a base between two antennas.
Figure 8:
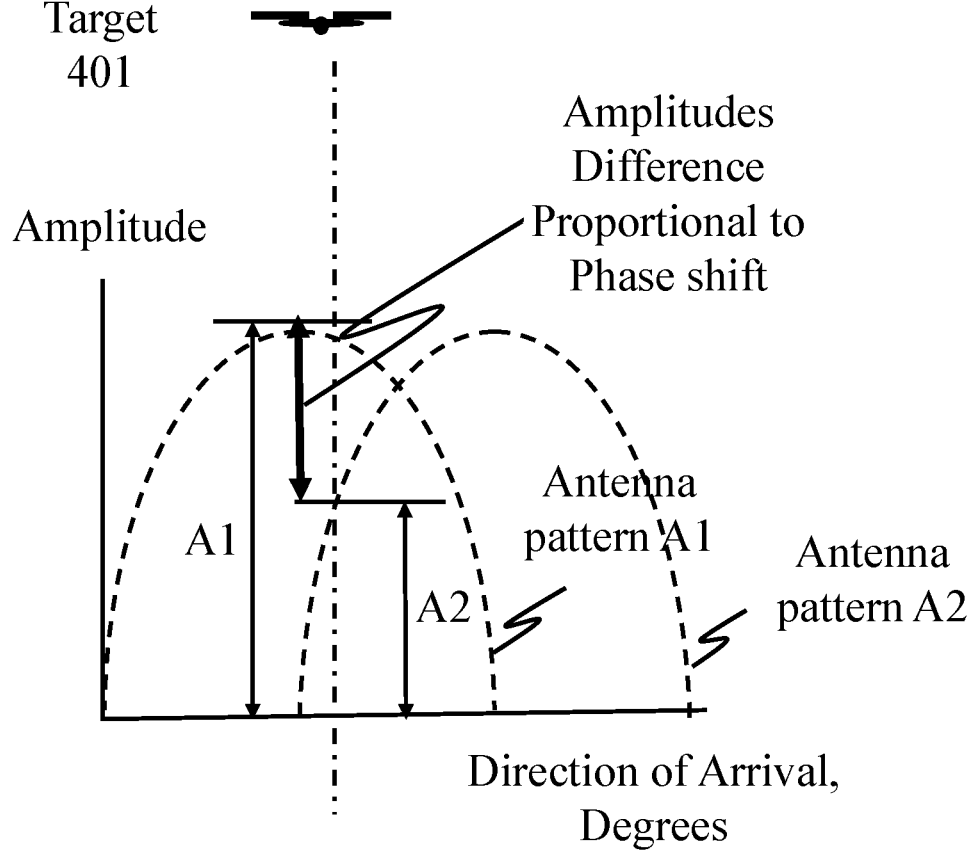
FIG. 8 shows diagram of phase difference measurement using overlap antenna patterns by monopulse method.

FIG. 7 shows a diagram of phase difference measurement using a base between two antennas. FIG. 8 shows diagram of phase difference measurement using two directional antennas with overlap antenna patterns by monopulse method.

As seen from the diagram, smaller phase differences and same phase difference can be measured with much better accuracy by using antennas with overlap antenna patterns.

Moreover, the application of the monopulse method allows for decrease in passive radar receiver size and make it portable because do not need a base between antennas.

Figure 9:
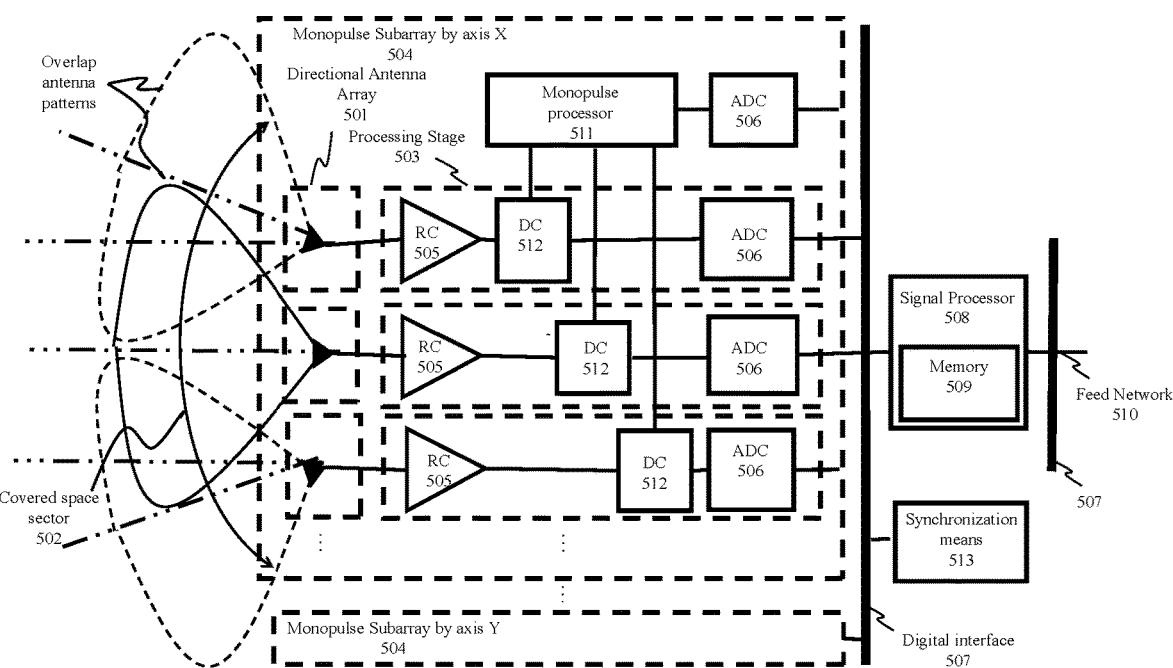
FIG. 9 representing a block-diagram of a passive radar receiver with an array of directional antennas and digital signals processing.

FIG. 9 representing a block-diagram of the first embodiment of passive radar receiver with an array of directional antennas and digital signals processing. Staring array of directional antennas 501 covering the entire sky or area of observation 502 and providing simultaneous continuous illumination (receiving reflected satellite signals) of multiple targets. Each directional antenna 501 coupled with separate processing stage 503 provides fast continuous parallel processing of information from all targets simultaneously. Antenna patterns of said directional antennas overlap in one or more directions for creating monopulse subarrays 504 by one or multiple axes, where signals from reference antennas providing highest directing accuracy and better clutter/noise and media influence suppression. Each said processing stage 503 comprises receiving chain 505 with signal conditioning circuit including voltage or current limiters, anti-aliasing circuits, analog-to-digital converter 506 and connected by digital interface 507 to signal processor 508 with memory 509 and feed network 510. Each said monopulse subarray 504 comprising of monopulse processor 511 connected by directed couplers 512 for simultaneous one or multi-axis processing of all signals in receiving chains 503 as the ratio of amplitudes and/or phase shift of signals for direction finding and one-iteration adapting for clutter suppressing or decrease transferring media influence to receiving chain parameters by a phase shift in a subarray of neighboring directional antennas with overlap antenna patterns. Feed network 510 connected by digital interface 507 arranged as universal serial bus (USB) or microwave and/or fiber optic waveguides to signal processor with memory for storing executable instructions and for separate processing of amplitudes, phases, frequency components shift of signals in receiving chains. All said processing stages 503 comprising receiving chains 505, monopulse processors 511, and signal processor 508 connected with synchronization means 513 by digital interface 507.

Figure 10:
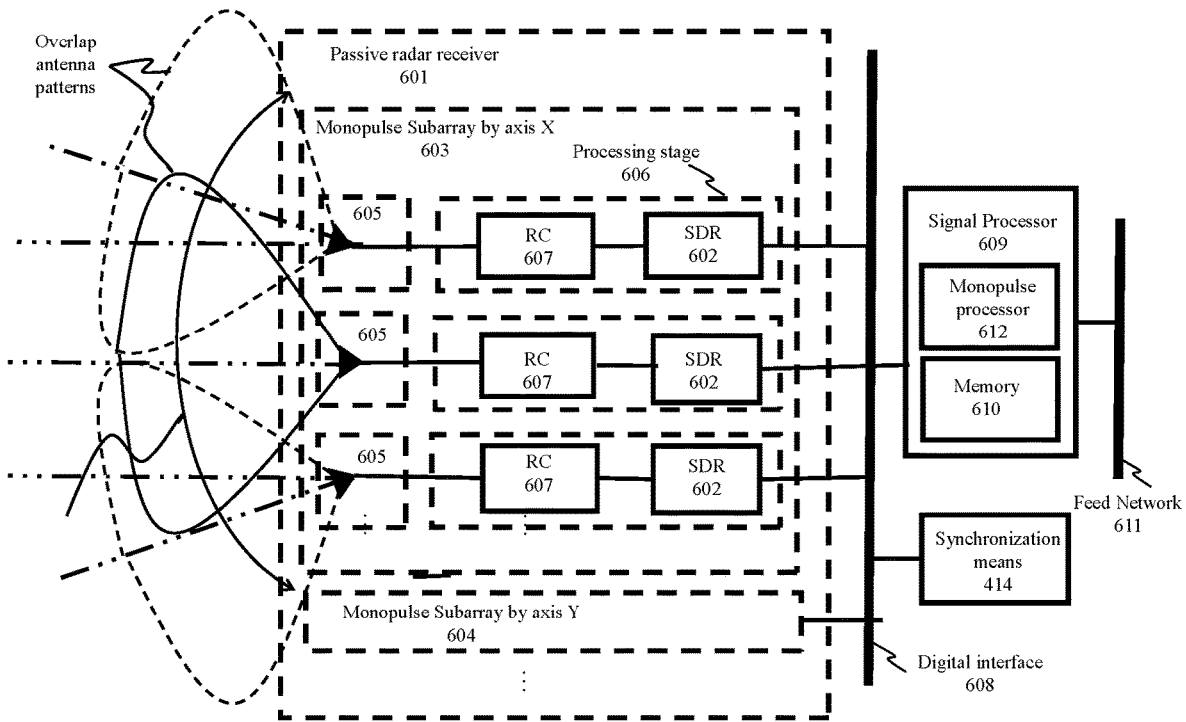
FIG. 10 representing a block-diagram of a passive radar receiver with SDR and monopulse subarrays.

FIG. 10 representing block-diagram of passive radar receiver 601 with Software Determined Radios (SDR) 602 and monopulse subarrays 604. Staring array of directional antennas 605 covering entire sky or area of observation 606 and provide simultaneous continuous illumination (receiving reflected satellite signals) of multiple targets. Each directional antenna 605 coupled with separate processing stage 606 providing fast continuous parallel processing of information from all targets simultaneously. Antenna patterns of said directional antennas overlap in one or more directions for creating monopulse subarrays 603 by one or multiple axes, where signals from reference antennas providing highest directing accuracy and better clutter/noise and media influence suppression. Each said processing stage 606 comprising receiving chain 607 with signal conditioning circuit including voltage or current limiters, anti-aliasing circuits, SDR 602 and connected by digital interface 608 to signal processor 609 with memory 610 and feed network 611. Said signal processor 609 comprising of monopulse processor 612 for simultaneous one or multi-axis processing of all signals in receiving chains 603 as ratio of amplitudes and/or phase shift of signals for direction finding and one-iteration adapting for clutter suppressing or decrease transferring media influence to receiving chain parameters by phase shift in subarray of neighboring directional antennas with overlap antenna patterns. Feed network 611 connected by digital interface 608 arranged as universal serial bus (USB) or microwave and/or fiber optic waveguides to signal processor with memory for storing executable instructions and for separate processing of amplitudes, phases, frequency components shift of signals in receiving chains. All said processing stages 603 comprising receiving chains 607 and signal processor 609 connected with synchronization means 613 by digital interface 608.

Figure 11:
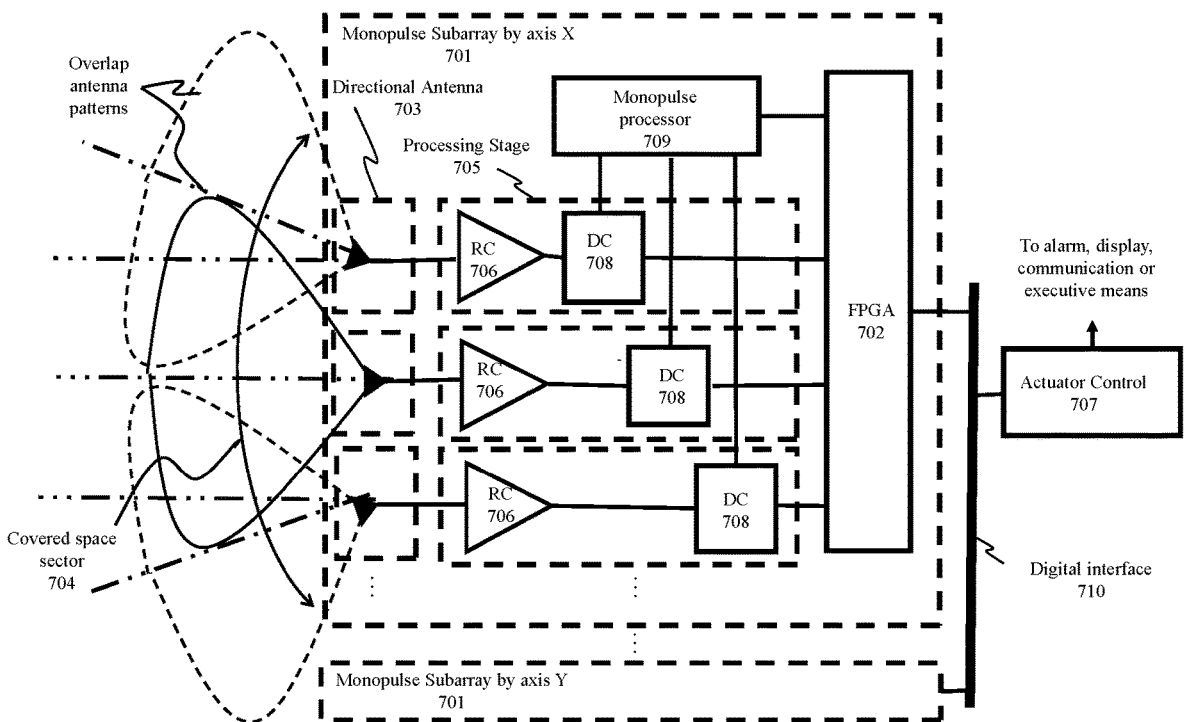
FIG. 11 shows a block-diagram of a passive radar receiver with an array of directional antennas and fast analog signals processing.

FIG. 11 shows a block-diagram of passive radar receiver with an array of directional antennas 701 and fast analog signals processing 702. Staring array of directional antennas 703 covering entire sky or area of observation 704 and provide simultaneous continuous illumination (receiving reflected satellite signals) of multiple targets. Each directional antenna 703 coupled with separate processing stage 705 providing fast continuous parallel processing of information from all targets simultaneously. Antenna patterns of said directional antennas overlap in one or more directions for creating monopulse subarrays 701 by one or multiple axes, where signals from reference antennas providing the highest directing accuracy and better clutter/noise and media influence suppression. Each said processing stage 705 comprising receiving chain 706 with signal conditioning circuit including voltage or current limiters, anti-aliasing circuits and connected to fast analog signal processor 702 and actuator control 611. Directed couplers 708 in each processing stage 705 connecting to monopulse processor 709 for simultaneous one or multi-axis processing of all signals in receiving chains 706 as the ratio of amplitudes and/or phase shift of signals for direction finding and one-iteration adapting for clutter suppressing or decrease transferring media influence to receiving chain parameters by phase shift in a subarray of neighboring directional antennas with overlap antenna patterns. Actuator control 707 is connected by a digital interface 810 arranged as a universal serial bus (USB) or microwave and/or fiber optic waveguides to fast analog signal processor 702.

Figure 12:
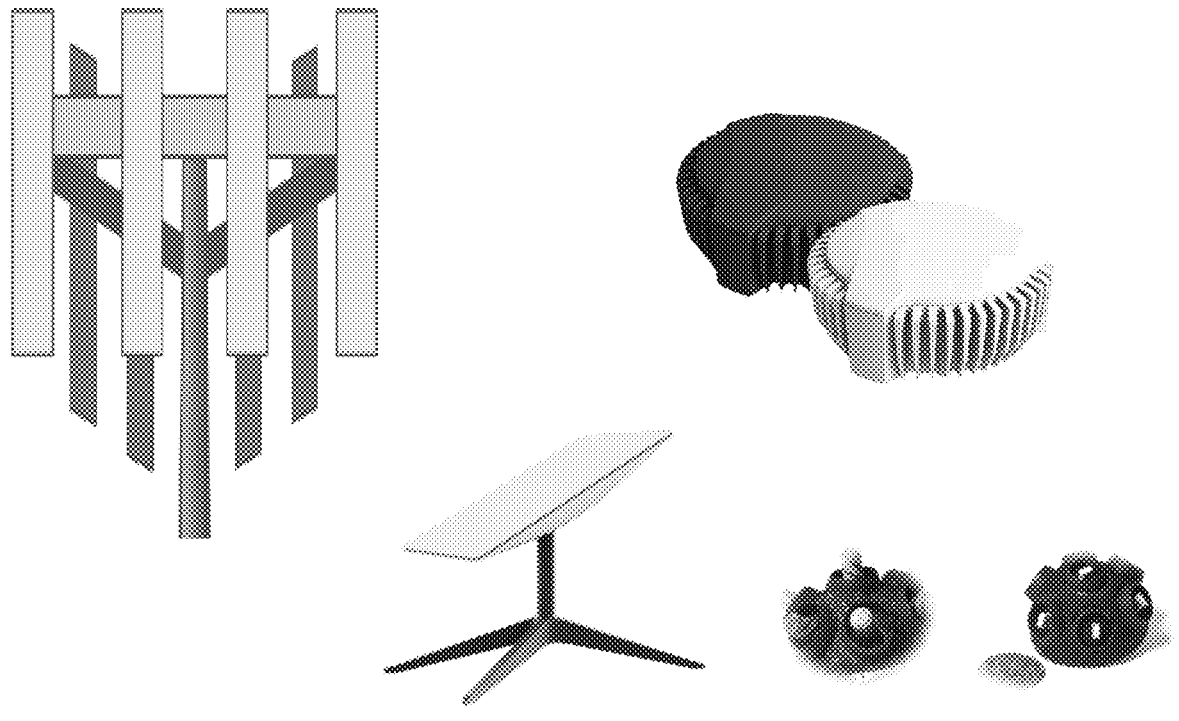
FIG. 12 representing the possible arrangement of non-scanning directional antenna arrays for passive radar receiver.

FIG. 12 representing the possible arrangement of non-scanning directional antenna arrays for passive radar receiver.

REFERENCE NUMBERS

101—Satellite
102—Satellite signal

10

103—Target
104—Reflected from target signal
105—Array of directional antennas
201—Satellite
202—Satellite signal
203—Target
204—Satellite signal reflected from target
205—Array of directional antennas
206—Continuous covered space sector by overlap antenna patterns
301—Satellite
302—Satellite signal
303—Target
304—Short pulse satellite signal reflected from target
305—Array of directional antennas
306—Continuous covered space sector by overlap antenna patterns
401—Target
501—Array of directional antennas
502—Covered space sector
503—Processing stage
504—Monopulse subarray
505—Receiving circuit
506—Analog to digital converter
507—Digital interface
508—Signal processor
509—Memory
510—Feed network
511—Monopulse processor
512—Directed coupler
513—Synchronization means
601—Passive radar receiver
602—SDR
603—Monopulse subarray by axis X
604—Monopulse subarray by axis Y
605—Processing stage
606—Covered space sector
607—Receiver circuit
608—Digital interface
609—Signal processor
610—Memory
611—Feed network
612—Monopulse processor
613—Synchronization means
701—Monopulse subarray
702—Fast analog processor
703—Directional antenna array
704—Covered space sector
705—Processing stage
706—Receiving circuit
707—Actuator control
708—Directed coupler
709—Monopulse processor
710—Digital interface
801—Non-scanning directional antenna arrays

OPERATION

Proposed passive detection of low-profile low altitude targets based on application of Low Earth Orbit (LEO) and Very Low Earth Orbit (VLEO) satellite signals by the radar receiver comprising at least one array of antenna elements and at least one processing stage adapted to process signals received via each antenna element of said array. Detection of direct satellite signals and satellite signals reflected from targets providing by continuous (not scanning) staring array of directional antennas covering the entire sky or area of observation providing by simultaneous continuous illumination (receiving reflected satellite signals) of multiple targets.

The next step is simultaneous (parallel) processing of direct satellite signals and satellite signals reflected from targets from each directional antenna by a separate processing stage including a reference signal for target detection, which is correlated with the reflected signal. Direct satellite signals and satellite signals reflected from targets are digitizing directly in each directional antenna by a separate processing stage comprising receiving chain with a signal conditioning circuit including voltage or current limiters, anti-aliasing circuits, analog-to-digital converter, and connected by digital interface to signal processor and feed network. Processing of direct satellite signals and satellite signals reflected from targets received by said directional antennas with overlap antenna patterns creating monopulse subarrays, providing simultaneously, by application of monopulse method. In this case, signals from reference antennas providing the highest directing accuracy and better clutter/noise and media influence suppression. All signals in receiving chains are processing simultaneously (monopulse method) as the ratio of amplitudes and/or phase shift of signals for direction finding and one-iteration adapting for clutter suppressing or decrease transferring media influence to receiving chain parameters by a phase shift in a subarray of neighboring directional antennas with overlap antenna patterns.

Processed signals are transferring to the feed network by digital interface arranged as a universal serial bus (USB) or microwave and/or fiber optic waveguides connected to the signal processor. Synchronization of all said processing stages, monopulse processors, and signal processor providing by synchronization means.

CONCLUSION

Cover of entire sky and continuous illumination (receiving reflected satellite signals) of multiple targets providing by parallel processing of information in staring array of directional antennas corresponding to claim 1,7,8 increasing radar sensitivity, detection range and recognition probability for low profile low altitude targets.

The coupling of each directional antenna with a separate receiver channel allows receive information about multiple targets simultaneously and much faster.

Monopulse processing of signals from reference sub-set of antennas with overlap antenna patterns corresponding to claim 1,7,8 provides the highest directing accuracy and better clutter/noise and media influence suppression.

Separate controlling of transmitting power and gain of receiver chains in each subdivided sector by automatic gain control circuit proposed in claim 1,7,8 provides the possibility to use the proposed radar system in urban and mountainous areas. Automatic gain control circuits also allow to simultaneous detection of small range targets with high amplitude reflected targets and targets with small, reflected signals.

Application of multiple directional antennas provides larger signal gain (claim 2,3) compered to phase arrays, where signal gain decreasing proportionally to number of beams.

Distribution of directional antennas described in claims 2-6 decreases passive radar vulnerability because each directional antenna/subarray covering one subdivided sector and cannot be damaged by EMP positioned outside of the sector area because of the application of directional antennas.

Reflected signals simultaneously receiving from all targets within each subdivided sector and can be processed same time.

Digitizing and synchronization of all receiving signals (Claim 1,7,8) by microwave or/and optical means directly on directional antennas allows loos distribution of antennas without complicated phase adjustment matrixes.

A directional antenna array does not need beam forming module. The system has small weight, size, may be portable or mounted on light vehicle or small drone because small size and weight.

The invention claimed is:

1. A passive radar system based on the application of Low Earth Orbit (LEO) and Very Low Earth Orbit (VLEO) satellites signals for detection of low-profile low altitude targets wherein the radar receiver comprising at least one array of antenna elements and at least one processing stage adapted to process signals received via each antenna element of said array wherein:

each directional antenna coupled with a separate processing stage providing fast continuous parallel processing of information from all targets simultaneously;

antenna patterns of said directional antennas overlap in one or more directions for creating monopulse subarrays, where signals from reference antennas providing the highest directing accuracy and better clutter/noise and media influence suppression and said array of antenna elements arranged as a staring array of directional antennas covering the entire sky or area of observation and provide simultaneous continuous illumination (receiving reflected satellite signals) of multiple targets;

each said processing stage comprising a receiving chain with a signal conditioning circuit including voltage or current limiters, anti-aliasing circuits, Automatic Gain Control (AGC) means, analog-to-digital converter and connected by digital interface to signal processor and feed network;

each said monopulse subarray comprising of monopulse processor for simultaneous one or multi-axis processing of all signals in receiving chains as the ratio of amplitudes and/or phase shift of signals for direction finding and one-iteration adapting for clutter suppressing or decrease transferring media influence to receiving chain parameters by a phase shift in a subarray of neighboring directional antennas with overlap antenna patterns;

feed network connected by digital interface arranged as universal serial bus (USB) or microwave and/or fiber optic waveguides to signal processor with memory for storing executable instructions and for separate processing of amplitudes, phases, frequency components shift of signals in receiving chains;

all said processing stages comprising receiving chains, monopulse processors, and signal processor connected with synchronization means by digital interface.

2. The passive radar system of claim 1, wherein said array of antenna elements arranged as concave, convex, cylindric full/hemi sphere modules consisting of a plurality of antenna elements that forming directional antennas.

3. The passive radar system of claim 1, wherein said directional antennas are arranged as separate antennas or formed as subarray of antenna elements arranged on the substrate surface, in the volume of substrate or combined.

4. The passive radar system of claim 1, wherein said processing stages consisting of receiving circuits and signal processor are arranged for simultaneous transmitting, receiving, and processing signals on a few different frequencies (multi-frequency signals) and comprising corresponding arranged directional antennas, anti-aliasing circuits, and filtering means in each transmitter and receiving chain.

5. The passive radar system of claim 1, wherein said processing stages consisting of receiving circuits and signal processor are arranged for simultaneous transmitting, receiving, and processing of different modes signals, such as communication, navigation, control (multi-mode, multi-function signals) and comprising corresponding arranged directional antennas, anti-aliasing circuits, and filtering means in each transmitter and receiving chain.

6. The passive radar system of claim 1, wherein said processing stages consisting of receiving circuits and signal processor are arranged for simultaneous processing received signals for detection direction of arriving for jam and/or spoof signals and comprising corresponding arranged analog and digital filtering means in each receiving chain and signal processor.

7. A passive radar system based on the application of Low Earth Orbit (LEO) and Very Low Earth Orbit (VLEO) satellites signals for detection of low-profile low altitude targets wherein the radar receiver comprising at least one array of antenna elements and at least one processing stage adapted to process signals received via each antenna element of said array wherein:

said array of antenna elements arranged as a staring array of directional antennas covering the entire sky and providing simultaneous continuous illumination (receiving reflected satellite signals) of multiple targets;

each directional antenna coupled with a separate processing stage providing a fast continuous parallel process of information from all targets simultaneously;

antenna patterns of said directional antennas overlap in one or more directions for creating monopulse subarrays, where signals from reference antennas providing the highest directing accuracy and better clutter/noise and media influence suppression;

each said processing stage comprising a receiving chain with a separate software defined radio (SDR) via signal conditioning circuit including voltage or current limiters, anti-aliasing circuits, Automatic Gain Control (AGC) means and connected by digital interface to signal processor and feed network;

said signal processor comprising of monopulse processor for simultaneous multi-axis processing of all signals in receiving chains as the ratio of amplitudes and/or phase shift of signals relative to signals in reference antenna sub-array coupled with receiving chain for direction finding and one-iteration adapting to decrease transferring media influence to receiving chain parameters by a phase shift in a subarray of neighboring directional antennas with overlap antenna patterns;

feed network connected by digital interface arranged as universal serial bus (USB) or microwave and/or fiber optic waveguides to signal processor with memory for storing executable instructions and for separate processing of amplitudes, phases, frequency components shift of signals in receiving chains;

all said processing stages comprising receiving chains, monopulse processor, and signal processor connected with synchronization means by digital interface.

8. A passive radar system based on the application of Low Earth Orbit (LEO) and Very Low Earth Orbit (VLEO) satellites signals for detection of low-profile low altitude targets wherein the radar receiver comprising at least one array of antenna elements and at least one processing stage adapted to process signals received via each antenna element of said array wherein for fast targets signals processing:

said array of antenna elements arranged as a staring array of directional antennas covering the entire sky and provide simultaneous continuous illumination (receiving reflected satellite signals) of multiple targets;

each directional antenna coupled with a separate processing stage providing fast continuous parallel process of information from all targets simultaneously;

antenna patterns of said directional antennas overlap in one or more directions for creating monopulse subarrays, where signals from reference antennas providing the highest directing accuracy and better clutter/noise and media influence suppression;

each said processing stage comprising a receiving chain with a signal conditioning circuit including voltage or current limiters, anti-aliasing circuits, Automatic Gain Control (AGC) means and connected to Field-Programmable Gate Array (FPGA) and to actuator control;

each said monopulse subarray comprising of FPGA for simultaneous one or multi-axis processing of all signals in receiving chains as the ratio of amplitudes and/or phase shift of signals for direction finding and one-iteration adapting for clutter suppressing or decrease transferring media influence to receiving chain parameters by a phase shift in a subarray of neighboring directional antennas with overlap antenna patterns;

each said monopulse subarray is connected by a digital interface arranged as a universal serial bus (USB) or microwave and/or fiber optic waveguides directly to actuator control for fast control of alarm, display, communication, or executive means;

all said processing stages comprising receiving chains, monopulse processor, and signal processor connected with synchronization means.

* * * * *